(12) United States Patent
Kristjansson

(10) Patent No.: US 6,258,007 B1
(45) Date of Patent: Jul. 10, 2001

(54) MULTI-SENSOR HARMONIC DRIVE ACTUATOR ARRANGEMENT ASSEMBLY

(75) Inventor: Erlendur Kristjansson, Salem, MA (US)

(73) Assignee: Teijin Seiki Boston, INC, Peabody, MA (US)

( * ) Notice: Subject to any disclaimer, the term of this patent is extended or adjusted under 35 U.S.C. 154(b) by 0 days.

(21) Appl. No.: 09/321,038

(22) Filed: May 27, 1999

(51) Int. Cl.[7] .......................... B60K 41/04; F16H 49/00
(52) U.S. Cl. ........................... 477/7; 477/20; 74/640
(58) Field of Search .................. 74/640; 477/7, 477/15, 20

(56) References Cited

U.S. PATENT DOCUMENTS

| | | | |
|---|---|---|---|
| 4,506,590 | * | 3/1985 | Miki et al. ........................ 477/184 |
| 4,566,352 | * | 1/1986 | Stiff .................................. 74/640 |
| 4,608,651 | * | 8/1986 | Murakami et al. ................ 477/13 |
| 4,770,060 | * | 9/1988 | Elrod et al. ....................... 74/640 |
| 5,626,055 | * | 5/1997 | Fukui ................................ 477/9 |

* cited by examiner

Primary Examiner—Sherry Estremsky
(74) Attorney, Agent, or Firm—Dan Halgren

(57) ABSTRACT

The invention comprises an actuator controlled harmonic drive transmission assembly for the speed and positional control of an output shaft of the harmonic drive transmission. The assembly includes a motor having a rotor shaft for providing rotational power to harmonic drive transmission and a control arrangement for permitting rotational positional and speed control between the rotor shaft and the output shaft of the harmonic drive transmission. The control arrangement may comprise an output speed, torque, vibration and/or rotational encoder mounted on the output shaft of the harmonic drive transmission. The control arrangement may comprise an output speed and rotational encoder mounted on the rotor shaft of the motor, each encoder feeding data to a control logic unit to control the motor driving the transmission.

18 Claims, 4 Drawing Sheets

MULTI-SENSOR HARMONIC DRIVE ACTUATOR ARRANGEMENT ASSEMBLY

BACKGROUND OF THE INVENTION

1. Field of the Invention

This invention relates to harmonic drive transmissions, and more particularly to sensor driven actuator arrangements to improve the positional accuracy of harmonic drive systems.

2. Prior Art

Harmonic drive transmissions, sometimes known as controlled-ratio deflection type transmissions, are used where rotary to rotary transmission is needed. In such a transmission, the gear tooth engagement is induced at a plurality of points by the deflection of a thin ring gear or the like. The tooth engagement at a plurality of points around the circumference is propagated along the periphery of a thin ring gear as the crest of the induced deflection ring is made to move around this periphery. As the deflection moves around the gear, each tooth moves radially in and out of engagement as it progresses from one tooth to the next, tracing during this motion, a curve which is generally of the character of a sinusoidal wave, giving rise to the term "strain-wave gearing".

Examples of such early transmissions of this type are shown in U.S. Pat. No. 2,906,143, issued in 1959 to Musser, U.S. Pat. No. 2,931,249 issued to Musser, and U.S. Pat. No. 3,196,713 issued to Robinson, all of which are incorporated herein by reference.

Those transmission have found use in certain industries where rotary power is needed and increasingly so in the robotics industry. Such use, particularly in the robotics industry requires extreme accuracy. Heretofore, robotic transmissions and drive units have been empowered by direct drive motors which are able to repearably position the rotation of a shaft, within plus or minus 3 arc seconds. These motors typically are brushless and have a high output torque at a low velocity. Direct drive motors unfortunately are also very expensive.

It is an object of the present invention to provide a harmonic drive assembly, which may function as a direct drive motor replacement in the robotic industry.

It is yet a further object of the present invention, to provide a harmonic drive actuator arrangement, which permits highly accurate corrective positioning of the output shaft.

It is yet still a further object of the present invention to provide a harmonic drive apparatus with a sensor/encoder arrangement for speed and/or torque, position, vibration, temperature, performance degradation and/or tooth wear sensing utilizing self-diagnostic control of the apparatus.

BRIEF SUMMARY OF THE INVENTION

The present invention comprises a harmonic drive transmission coupled together with and being driven by an electric motor. This electric input motor is in a driving relationship with the input motor shaft connected to the input wave generator of the harmonic drive transmission. The electric input motor has a stator and a rotating rotor arranged within its housing. A sensor, here, an input shaft encoder, is disposed on the input end of the rotor of the electric motor. The input encoder, preferably of the optical type, or possibly the magnetic type, is arranged on the rotor of the electric motor, and is in electrical communication, via a proper circuit, with a control logic unit.

The flexspline in the harmonic drive transmission, is connected to an output shaft of the electric motor, the flexspline/harmonic drive transmission all driven by the electric motor. A sensor here, such as an output encoder, such as a magnetic or optical output encoder, may be arranged on the output shaft of the harmonic drive transmission. The output encoder is in electrical communication with the control logic unit, as is the input encoder. The control logic unit controls a power drive converter, which is in electrical communication with the electric motor.

A control signal from a proper operator control unit is inputted to the control logic unit. The control logic unit received signals from both the input encoder and the output encoder, making an analysis and comparison therebetween. The control logic unit governs the converter, to regulate the electric input motor. Alignment and matching of the signals between the output encoder on the output shaft of the harmonic drive transmission and the input encoder on the rotor of the electric motor permits the apparatus to have a power output from the harmonic drive transmission which is speed controllable and positionally governable with a repeatability to about 3 arc seconds of accuracy. The output encoder, which may be the magnetic or optical type, is preferably arranged as close to the output bearing on the harmonic drive transmission as possible, to minimize any possible error from axial loading upon the output shaft of the harmonic drive transmission. Thus, high precision rotational output control is achieved within the multisensor/encoder harmonic drive actuator assembly of the present invention.

A further embodiment of the present harmonic drive actuator assembly consists of a harmonic drive transmission similar to that of the aforementioned embodiment, having an input wave generator arranged within the housing and in wave generating communication with a flexspline attached to an output shaft of the harmonic drive transmission. An electric input motor has a shaft connected to the input shaft on the input wave generator. The electric motor has a stator and a rotor shaft at a first end thereof. A control logic and power drive unit is arranged about the rotor shaft on the electric input motor. An input encoder of the magnetic or optical type is attached about the rotor shaft adjacent the control logic and power unit on the electrical motor.

An output encoder, either the magnetic or optical type, is arranged about the output shaft of the harmonic drive transmission, extending from the flexspline. The output encoder is in electrical communication with the control logic and power drive unit on the electrical input motor. The input encoder arranged on the rotor shaft is in electrical communication with the control logic and power drive unit mounted adjacent the rotor shaft. An AC/DC converter is in communication with the control logic and power drive unit. An operator control signal is in electrical communication with the control logic and power drive unit on the electric motor rotor shaft, and operates the harmonic drive actuator assembly. Rotational input from the input motor drives the input wave generator to provide proportionate corresponding motion of the flexspline and the output shaft. Position and speed performance of the output shaft is monitored by the output encoder, which sends an output performance signal to the control logic and power drive unit. A corresponding speed and rotational position sensor on the rotor shaft of the electric motor sends a performance signal of the motor shaft of the electric motor, to the control logic and power drive unit. Correspondence between the input performance from the electric motor, and output performance from the harmonic drive transmission is maintained by the comparison between the sensor signals of the input encoder and the output encoder, to provide high precision position correction between the two assembly components. Torque control may be achieved with additional sensors such as torque (current) sensors in place at or in addition to the position sensors already identified hereinabove.

Thus, by having the appropriate sensors preferably arranged at one or opposite ends of a motor/harmonic drive transmission assembly, to optically, electrically, eletromechanically and/or magnetically determine speed, torque, and position performance between the input and the output of such assembly, permitting position control and accuracy of that assembly.

The invention thus includes an actuator controlled harmonic drive transmission for the speed and positioned control of an output shaft of the harmonic drive transmission, comprising: a motor having a rotor shaft for providing rotational power to harmonic drive transmission; and a control arrangement for permitting rotational positional and speed control between the rotor shaft and the output shaft of the harmonic drive transmission. The control arrangement may comprise an output speed and rotational encoder mounted on the output shaft of the harmonic drive transmission. The control arrangement may also comprise an input speed and rotational encoder mounted on the rotor shaft of the motor. The output encoder may be a magnetic or optical encoder or sensor, which is also known as a "resolver". The input encoder may be an optical encoder. The control arrangement preferably includes a feed back loop which communicates with a control logic and power drive unit which governs the motor.

The invention also includes a method of controlling the output of a harmonic drive transmission, to permit positional and rotative accuracy of an output shaft of the harmonic drive transmission, comprising the steps of: arranging a rotor of a motor to rotatively empower an input wave generator of the harmonic drive transmission; coupling an output speed and positional encoder on the output shaft of the harmonic drive transmission; and attaching a circuit from the output encoder to the motor feed back control data to signal speed and positional information to control logic unit governing the motor for controlled accuracy thereof. The method may include the steps of: coupling an input speed and positioned encoder on the rotor of the motor empowering the harmonic drive transmission; and attaching a circuit from the input encoder on the rotor to feed back control data to signal speed and positioned information to the control logic unit for comparing input and output data to control positional speed characteristics of the input and output shafts of the harmonic drive transmission. The input encoder may be an optical or magnetic encoder to optically or magnetically sense the speed and position characteristics of the rotor on the motor. The output encoder may be a magnetic encoder to sense the speed position characteristics of the output shaft on the harmonic drive transmission.

BRIEF DESCRIPTION OF THE DRAWINGS

The objects and advantages of the present invention will become more apparent, when viewed in conjunction with the following drawings, in which.

DESCRIPTION OF THE PREFERRED EMBODIMENTS

Figure 1:
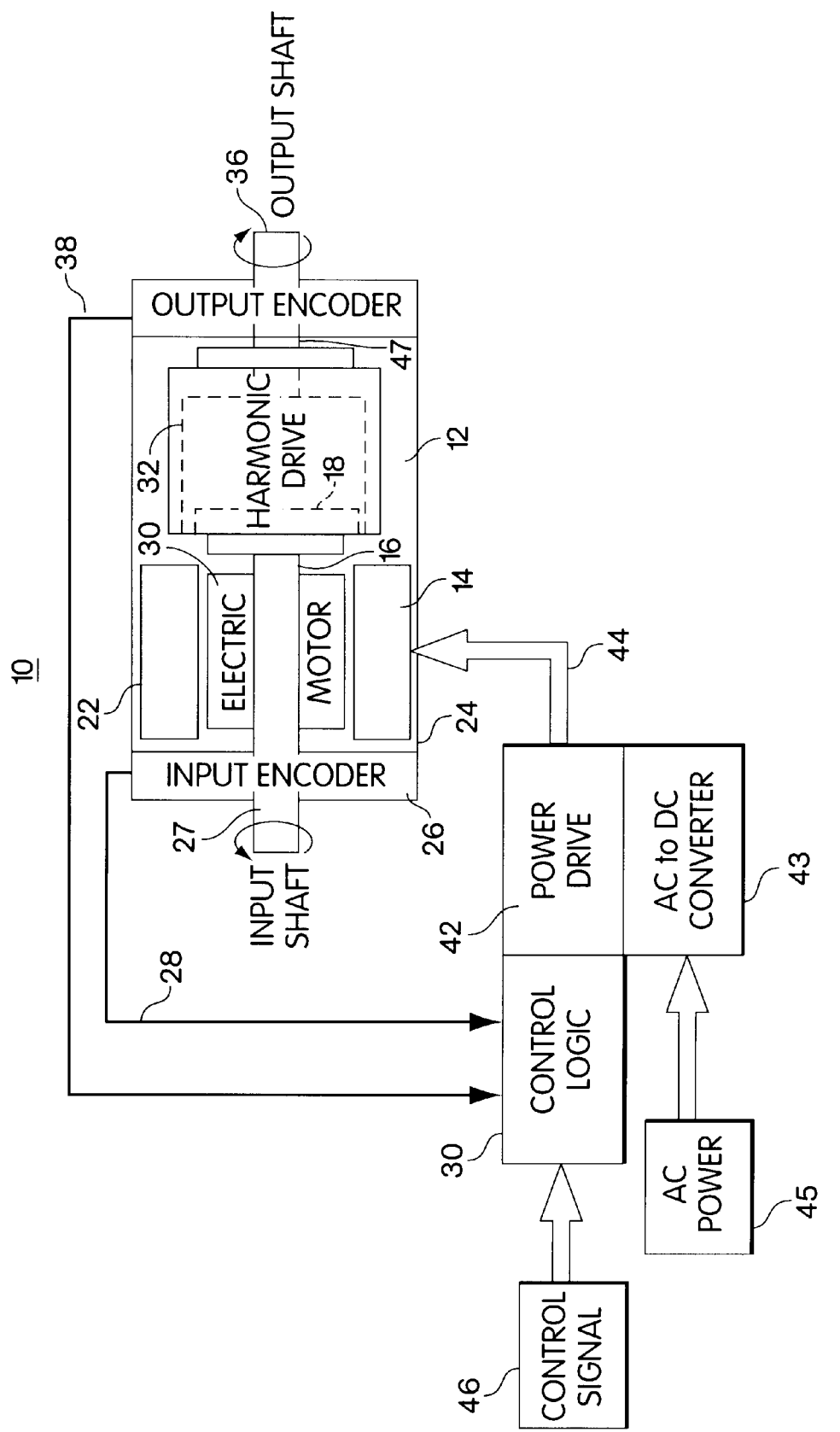
FIG. 1 is a schematic representation of a harmonic drive assembly with an electric input motor and an encoder arrangement on each end of said assembly.

Referring now to the drawing in detail, and particularly to FIG. 1, there is shown the present invention in which a harmonic drive transmission actuator assembly 10 having a harmonic drive transmission 12 coupled together with and being driven by an electric motor 14. The electric motor 14 has an output shaft 16 which is in a driving relationship with an input wave generator 18 of the harmonic drive transmission 12. The electric input motor 12 has a rotable rotor 20 and a stator 22 arranged within its housing 24. An input shaft encoder 26, is disposed on the distal end 27 of the input shaft 16 of rotor 20 of the electric motor 14, as may be seen in FIG. 1. The input encoder 26, preferably of the optical type, in an alternate embodiment, of the magnetic type, is arranged on the end of the input shaft 27 of the rotor 20 of the electric motor 14, and is in electrical communication, via a proper circuit 28, with a control logic unit 30. The control logic unit 30 is an electronic micro-controller and/or programmable logic device that controls the power drive unit 42 as needed to control position, speed and/or torque. The power drive unit 42 is a circuit to connect to and convert fixed DC voltage into a controlled voltage to permit the motor 12 to run at a variable speed and or torque in either direction. An AC to DC converter 43 is in communication with the power drive 42, to rectify AC voltage from an AC source 45 into a constant DC voltage.

The harmonic drive transmission 12 has a flexspline 32 which is rotated via an advancing wave created by the wave generator 18, the wave generator 18 being connected to the output shaft 16 of the electric motor 14, as shown in FIG. 1. The flexspline/harmonic drive transmission 32/12 is driven by the electric motor 14. An output encoder 34, preferably for example, a magnetic output encoder, is arranged about the output shaft 36 end of the harmonic drive transmission 12. The output encoder 34 is in electrical communication via a proper circuit 38, with the control logic unit 30, as is the input encoder 26. The control logic unit 30 controls the power drive 42 and the AC/DC converter 43, which is in controlling electrical communication with the electric rotor 14 via a proper control circuit 44.

A control signal from a proper operator control unit 46 is inputted to the control logic unit 30. The control logic unit 30 receives signals from both the input encoder 26 and the output encoder 34, making performance analysis and comparisons therebetween. The control logic unit 30 governs the power drive 42 and the AC/DC converter 43, to regulate the electric input motor 14 as aforementioned. Alignment and matching of the performance signals between the output encoder 34 on the output shaft 36 of the harmonic drive transmission 12 and the input encoder 26 on the input shaft 27 of the rotor 20 of the electric motor 14 permits the harmonic drive actuator apparatus 10 to have a power output from the harmonic drive transmission 12 which is torque controllable, speed controllable and "positionally" governable to about 3 arc seconds of accuracy. The output encoder 34, preferably magnetic, is preferably arranged as close to the output bearing 47 on the harmonic drive transmission 12 as possible, to minimize any possible error from axial loading upon the output shaft 36 of the harmonic drive transmission 12. Thus, high precision rotational output control is achieved within the harmonic drive actuator assembly 10 of the present invention.

Figure 2:
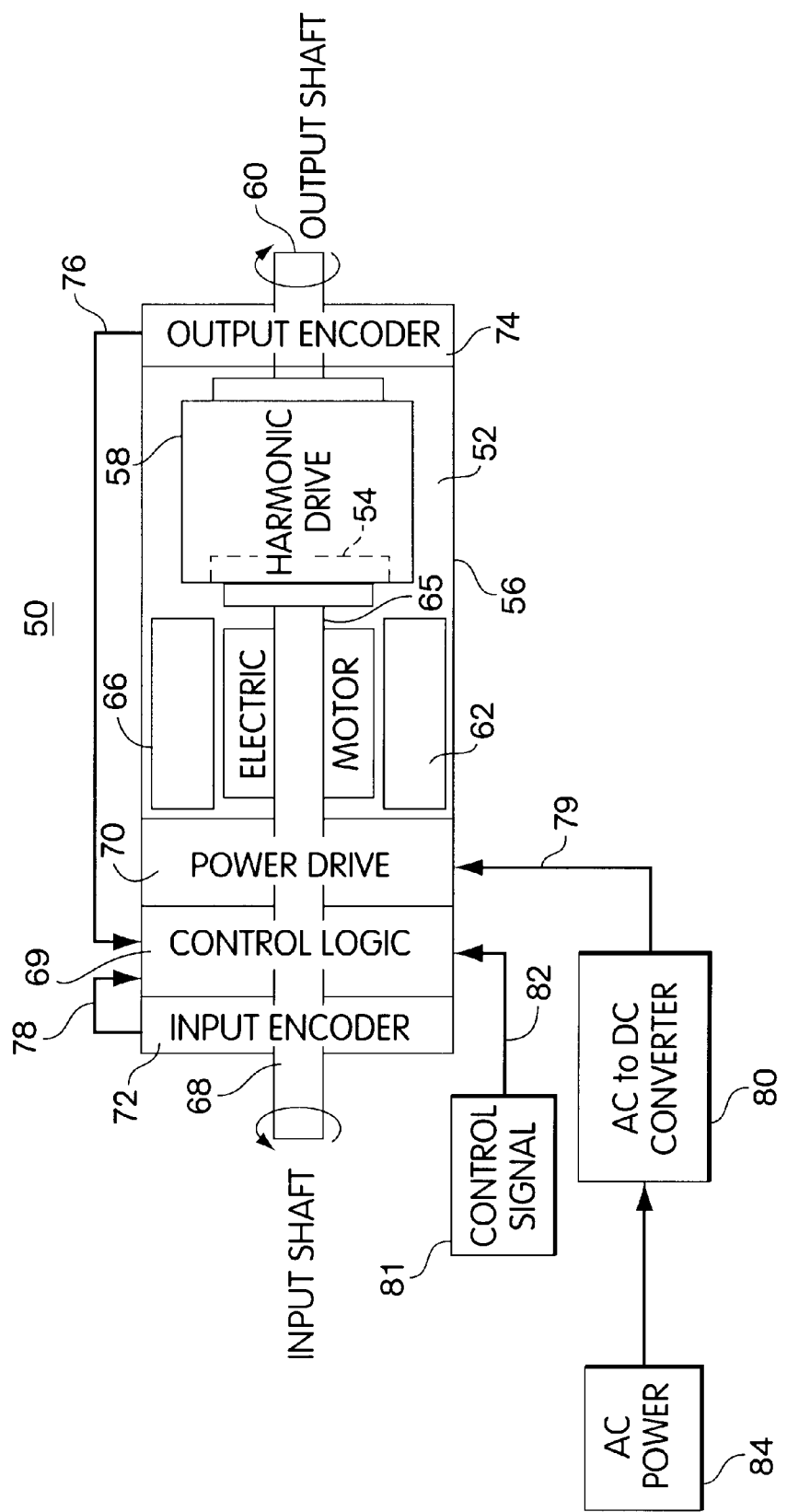
FIG. 2 is a schematic representation of harmonic drive assembly with an electric input motor and an encoder arrangement on each end of said assembly and a control logic unit on the input shaft.

A further embodiment of the harmonic drive actuator assembly 50 is shown in FIG. 2. The assembly 50 consists of a harmonic drive transmission 52, generally similar to that of the aforementioned embodiment, having an input wave generator 54 arranged within the housing 56 and in wave generating communication with a flexspline 58 attached to an output shaft 60 of the harmonic drive transmission 52. An electric input motor 62 has an output shaft 65 that is the input shaft on the wave generator 54. The electric input motor 62 has a stator 66 and an input rotor shaft 68 at a first end thereof. A control logic unit 69 and power drive unit 70 are communicatively arranged about the rotor shaft 68 on the input end of the assembly 50 adjacent the electric input motor 62. An input encoder 72, preferably of the optical type, is communicatively disposed about the rotor shaft 68 adjacent the control logic unit 69 and the power unit 70 on the electric motor 62. An output encoder 74, preferably the magnetic type, is communicatively arranged about the output shaft 60 of the harmonic drive transmission 52, extending from the flexspline 58. The output encoder 74 is in electrical communication, via a proper output circuit 76 with the control logic unit 69 on the input shaft 68 of the electric input motor 62. The input encoder 72 arranged on the rotor shaft 68 is in electrical communication, via a proper input circuit 78, with the control logic unit 69 on the rotor shaft 68. An AC/DC converter 80 is in communication with the power drive unit 70 via line 79. An operator control signal unit 81 is in electrical communication, via a proper logic circuit 82 with the control logic unit 69 on the rotor shaft 68 of the electric motor 62, and operates the harmonic drive actuator assembly 50. An AC power source 84 provides electrical power to the AC to DC converter 80. Rotational input from the electric input motor 62 drives the input wave generator 54 to provide proportionate corresponding motion to the flexspline 58 and the output shaft 60 of the harmonic drive transmission 52. Position, speed, and torque performance of the output shaft 60 is monitored by the output encoder 74, which sends an output performance signal via its circuit 76 to the control logic unit 69 and the power drive unit 70. The corresponding speed, torque, and rotational position input sensor 72 on the rotor shaft 68 of the electric motor 62 sends a performance signal of the rotor shaft 68 of the electric motor 62, to the control logic unit 69. Correspondence between the input performance from the electric input motor 62, and output performance from the harmonic drive transmission 52 is maintained by the comparison between the performances of the input between the two assembly components in the control logic unit 69, such as is often required in "stop and start" movement, particularly in the robotic field.

Thus, by having an input encoder 72 and an output encoder 74 arranged at opposite ends of a motor/harmonic drive transmission actuator assembly 10 or 50, to optically and/or magnetically determine speed, torque, and position performance between the input and the output of such assembly, such position control and accuracy of the assembly is maintained.

Figure 3:
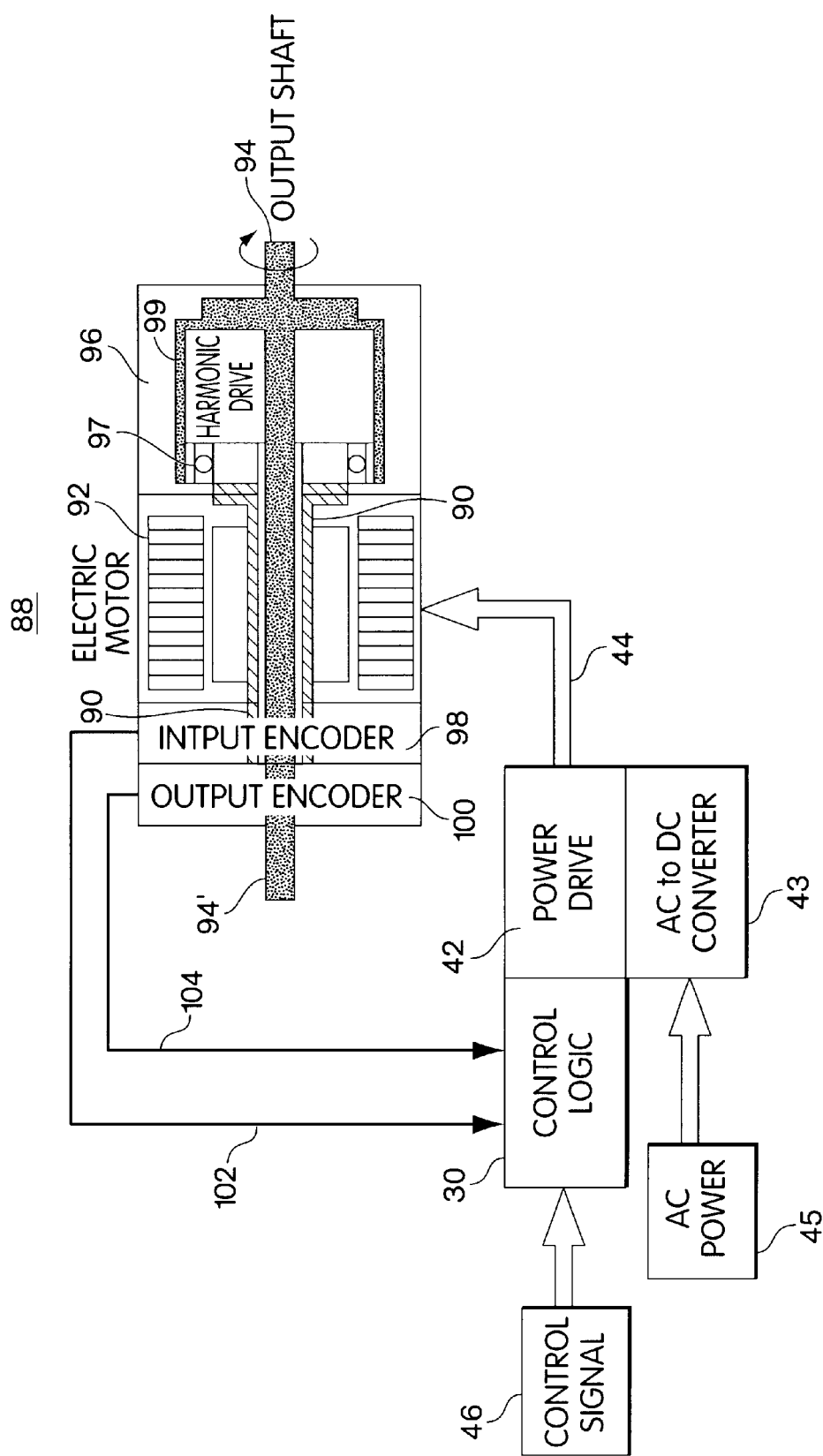
FIG. 3 is a schematic representation of a harmonic drive assembly similar to that of FIG. 1, with a logic unit and encoder on one end adjacent the electric motor assembly.

A further embodiment of a harmonic drive assembly 88 is shown in FIG. 3, having a hollow electric motor output shaft 90 arranged in the electric motor 92, with an output shaft 94' from the harmonic drive unit 96 through the hollow electric motor shaft 90 and out a first end of the assembly 88 (the left as seen in FIG. 3), and also an output shaft 94, out from the flexspline 99, (as seen on the right side of the assembly 88). In this embodiment, the input encoder 98 is arranged about the electric motor input shaft 90, and the output encoder 100 is arranged about the output shaft 94' which extends through the input shaft 90. The input shaft 90 extends from rotative empowerment within the electric motor 92, and is attached to the wave generator 97, in the harmonic drive 96 to provide rotative power to that flexspline 99, and hence rotative power to the output shaft ends 94 and 94'. The input encoder 98 disposed about the electric motor shaft 90 and the output encoder 100 disposed at the first end of the assembly 88 about the output shaft 94', are connected to the control logic unit 30, via proper circuits 102 and 104, respectively. The control signal unit 46, the control logic unit 30, the power drive unit 42, the AC power source 45 and the AC to DC converter 43 feed the harmonic drive assembly 88 similar to the setup shown in FIG. 1.

Figure 4:
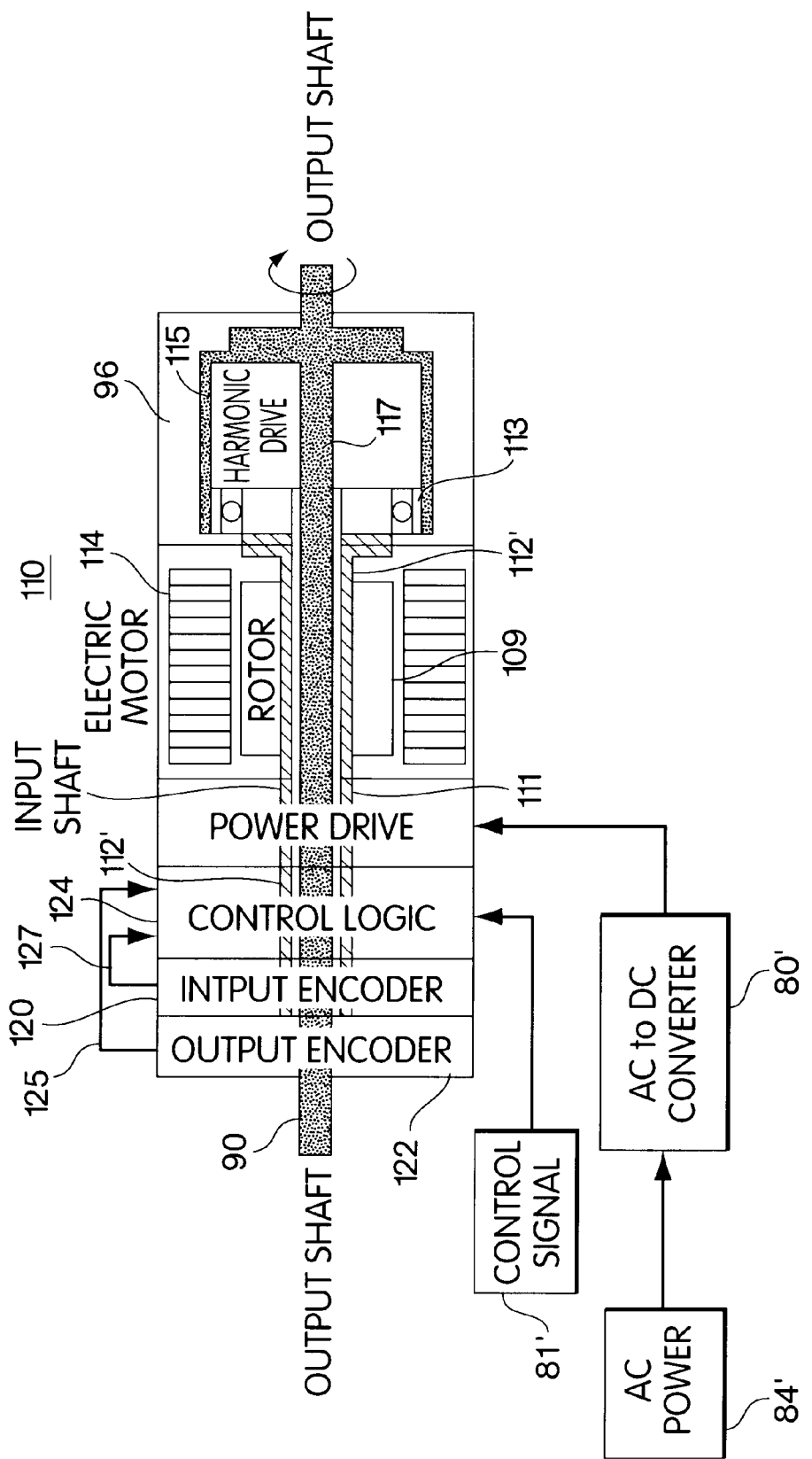
FIG. 4 is a schematic representation of a harmonic drive assembly similar to that of FIG. 3, with a control logic unit and encoder arrangement all on one end adjacent the electric motor assembly.

Similarly, a still further embodiment of a harmonic drive assembly 110 is shown in FIG. 4, with a hollow electric motor output shaft 111 attached to the rotor 109, the output shaft 111 having output shaft ends 112 and 112'. The first end 112' of the output shaft 111 provides input to and turns the wave generator 113 in the harmonic drive unit 96. The flexspline 115 in the harmonic drive unit 96 is connected to the output shaft 117 as shown in FIG. 4. The output shaft 117 extends through the hollow input shaft 111, as shown in FIG. 4. In this embodiment, the input encoder 120 and the control logic unit 124 are both communicatively arranged about the first end 112 of the input shaft 111. The output encoder 122 is arranged about the first end of the output shaft 90 of the harmonic drive transmission 96. The output encoder 122 is connected to the control logic unit 124 by a circuit 125. The input encoder 120 is in communication with the control logic unit 124 by a second circuit 127. The control signal unit 81', the AC power source 84', the AC to DC converter 80' feed the harmonic drive assembly 110 similar to the set up shown in FIG. 2. In this embodiment, the output encoder 125 and the input encoder 120 are adjacent one another, both arranged about the central output shaft 90, and the first end of the hollow shaft 111, as shown in FIG. 4. They permit control of parameters of input and output of a harmonic drive assembly 110 at a convenient common end of that harmonic drive assembly. Use of a hollow input shaft 111 and an output shaft 117 arranged through that hollow input shaft 111 is unique to the present harmonic drive invention.

What is claimed is:

1. An actuator controlled harmonic drive transmission assembly for the corrective control of adverse conditions of an output shaft of a harmonic drive transmission in said assembly, comprising:

a motor having a rotor shaft for providing rotational power to said harmonic drive transmission; and a sensing circuit arranged between a control circuit and said rotor shaft which is connected to said harmonic drive transmission for permitting corrective adjustable rotative control between said rotor shaft of said motor and said output shaft of said harmonic drive transmission.

2. The actuator controlled harmonic drive transmission assembly as recited in claim 1, wherein said sensing circuit comprises a rotational input encoder mounted on said rotor shaft.

3. The actuator controlled harmonic drive transmission assembly as recited in claim 2; wherein said encoder is a magnetic encoder.

4. The actuator controlled harmonic drive transmission assembly as recited in claim 2; wherein said encoder is an optical encoder.

5. The actuator controlled harmonic drive transmission assembly as recited in claim 1, wherein said sensing circuit comprises an input encoder and an output encoder mounted on said rotor shaft.

6. The actuator controlled harmonic drive transmission assembly as recited in claim 1, wherein said sensing and control circuit comprises a rotational output encoder mounted on said output shaft of said harmonic drive unit.

7. The actuator controlled harmonic drive transmission assembly as recited in claim 1, wherein said control circuit includes a feed back loop which communicates with a control logic and power drive unit which governs said motor.

8. A method of controlling the output of a harmonic drive transmission assembly, to permit positional, torque and/or rotative output accuracy of an output shaft of a harmonic drive unit of said assembly, comprising the steps of:

arranging a rotor of an electric motor to rotatively empower an input wave generator of said harmonic drive transmission;

coupling an input encoder on said rotor of said electric motor; and attaching a circuit from said encoder on said rotor to feed back control data to control unit governing said motor for controlled accuracy thereof.

9. The method of controlling the output of a harmonic drive transmission assembly as recited in claim 8, including the steps of:

coupling an output encoder on said rotor of said motor; and attaching a circuit from said output encoder on said rotor to feed back control data information to said control logic unit for comparing input and output data to control position, speed, torque and/or vibrational characteristics of said rotor and harmonic drive unit of said transmission assembly.

10. The method of controlling the output of a harmonic drive transmission as recited in claim 9, wherein said encoder is an optical encoder to optically sense the performance characteristics of said rotor on said motor.

11. The method of controlling the output of a harmonic drive transmission as recited in claim 9, wherein said encoder is a magnetic encoder to magnetically sense the performance characteristics of said harmonic drive transmission assembly.

12. The method of controlling the output of a harmonic drive transmission assembly as recited in claim 8, including the steps of:

coupling an output encoder on said shaft of said harmonic drive unit; and attaching a circuit from said encoder on said rotor to feed back control data information to said logic unit for comparing input and output data to control position, speed, torque and/or vibrational characteristics of said rotor and harmonic drive of said transmission assembly.

13. A harmonic drive assembly including an electric drive motor rotatively empowering a harmonic drive transmission, said transmission having an output shaft, said assembly having an arrangement for control of speed, vibration, torque and/or rotational location of said output shaft, comprising:

an input encoder arranged on said motor;

an output encoder arranged on said output shaft of said harmonic drive unit; and an arrangement of controls electrically connected with said encoders to drive and power said assembly with a controlled output of said shaft.

14. The harmonic drive assembly as recited in claim 13; wherein said arrangement of controls includes an AC to DC power converter.

15. The harmonic drive assembly as recited in claim 14, wherein said arrangement of controls also includes a control logic unit and a power drive unit in cooperative communication.

16. The harmonic drive assembly as recited in claim 15, wherein said encoders are all arranged about a shaft of said rotor of said motor and said harmonic drive transmission.

17. A harmonic drive assembly including an electric drive motor rotatively empowering a harmonic drive transmission, said transmission having an output shaft, said assembly having an arrangement for control of speed, vibration, torque and/or rotational location of said output shaft, comprising:

a hollow rotor shaft in said electric motor;

an output shaft of said harmonic drive transmission arranged through said hollow rotor shaft; and an arrangement of input and output sensors arranged on said hollow shaft and said output shaft for control of said assembly.

18. The harmonic drive assembly as recited in claim 17, wherein said sensors include:

an input encoder arranged on said hollow shaft; and an output encoder arranged on said output shaft of said harmonic drive unit.

* * * * *